United States Patent
Yang et al.

(10) Patent No.: US 6,993,182 B2
(45) Date of Patent: Jan. 31, 2006

(54) METHOD AND APPARATUS FOR DETECTING SCENE CHANGES IN VIDEO USING A HISTOGRAM OF FRAME DIFFERENCES

(75) Inventors: Yibin Yang, Pinebrook, NJ (US); Lilla Boroczky, Mount Kisco, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 631 days.

(21) Appl. No.: 10/109,772

(22) Filed: Mar. 29, 2002

(65) Prior Publication Data

US 2003/0185442 A1  Oct. 2, 2003

(51) Int. Cl.
  *G06K 9/00* (2006.01)
  *G06K 9/68* (2006.01)
(52) U.S. Cl. ...................... 382/168; 382/220
(58) Field of Classification Search ........... 382/107, 382/165, 166, 168, 170, 172, 219, 220, 221, 382/236, 239; 375/240.01, 240.02, 240.16; 348/231.99, 155, 700; 386/46; 358/522; 273/440.1
See application file for complete search history.

(56) References Cited

U.S. PATENT DOCUMENTS

| | | | |
|---|---|---|---|
| 5,614,960 A | | 3/1997 | Chiba et al. ............... 348/700 |
| 5,635,982 A | * | 6/1997 | Zhang et al. ........... 348/231.99 |
| 5,719,643 A | | 2/1998 | Nakajima ................. 348/700 |
| 5,774,593 A | | 6/1998 | Zick et al. ................ 382/236 |
| 5,801,765 A | | 9/1998 | Gotoh et al. .............. 348/155 |
| 6,408,024 B1 | * | 6/2002 | Nagao et al. ........... 375/240.01 |
| 6,473,459 B1 | * | 10/2002 | Sugano et al. .......... 375/240.16 |
| 6,766,098 B1 | * | 7/2004 | McGee et al. ............. 386/46 |
| 6,810,144 B2 | * | 10/2004 | McGee et al. ............ 382/166 |
| 2003/0063798 A1 | * | 4/2003 | Li et al. ................. 382/165 |
| 2003/0141665 A1 | * | 7/2003 | Li ........................ 273/440.1 |

OTHER PUBLICATIONS

Patent Abstracts of Japan,"Scene Change Detecting Method", Kobayashi Tomoko et al,Sanyo Electric, Co Ltd, Mar. 28, 1997 JP10276435.

* cited by examiner

*Primary Examiner*—Andrew W. Johns
*Assistant Examiner*—Amir Alavi
(74) *Attorney, Agent, or Firm*—Russell Gross

(57) ABSTRACT

The present invention is directed to method of detecting a scene change in video. The method includes a difference being calculated between consecutive frames of the video producing a plurality of difference values. A histogram is taken of the difference values. A scene change is detected if a majority of the difference values in the histogram exceed a predetermined value.

5 Claims, 3 Drawing Sheets

METHOD AND APPARATUS FOR DETECTING SCENE CHANGES IN VIDEO USING A HISTOGRAM OF FRAME DIFFERENCES

BACKGROUND OF THE INVENTION

The present invention relates generally to video processing, and more particularly to, detecting scene changes in video using a histogram of frame differences.

Scene change detection is used to detect a significant change in content between consecutive frames in a video sequence. For example, significant changes in content occur when a program switches to a commercial or another program, or switches to a different scene in the same program.

Accurate scene change detection may be used to improve the performance of different video processing algorithms. For example, it may be used in video enhancement algorithms to adjust certain parameters for different scene content. Scene change detection may also be used in video compression algorithms. For example, it may be used to determine when a new group of pictures has to be started or to anticipate bit rate changes.

A number of scene change detection techniques already exist. One technique take histograms of individual frames and then performs a comparison between the histograms of consecutive frames in order to detect a scene change. This technique works well in some situations. However, problems arise when the consecutive frames have similar pixel values in different positions. In this situation, the histograms of these two frames would be quite similar and thus would prevent a scene change from being detected.

Another technique uses coding information in order to detect a scene change. For example, this technique looks for an increase in a particular type of block in B-frames and P-frames in order to detect a scene change. This technique works well for B-frames and P-frames, however, it cannot be used for I-frames.

SUMMARY OF THE INVENTION

The present invention is directed to method of detecting a scene change in video. In one example, the method includes a difference being calculated between consecutive frames of the video producing a plurality of difference values. A histogram is taken of the difference values. A scene change is detected if a majority of the difference values in the histogram exceed a predetermined value.

In another example, the method includes determining if a frame of video is an I-frame. A scene change is detected based on a histogram of frame differences if the frame is an I-frame. Alternatively, a scene change is detected based on coding information if the frame is not an I-frame.

BRIEF DESCRIPTION OF THE DRAWINGS

Referring now to the drawings were like reference numbers represent corresponding parts throughout.

DETAILED DESCRIPTION

The present invention is directed to a scene detection technique that may be used in any situation. According to the present invention, this technique uses the histogram of the differences between two frames in order to detect a scene change. Further, a strategy is also proposed to reduce the computational complexity of scene change detection for MPEG encoded video by exploiting coding information from the compressed bit-streams.

Figure 1:
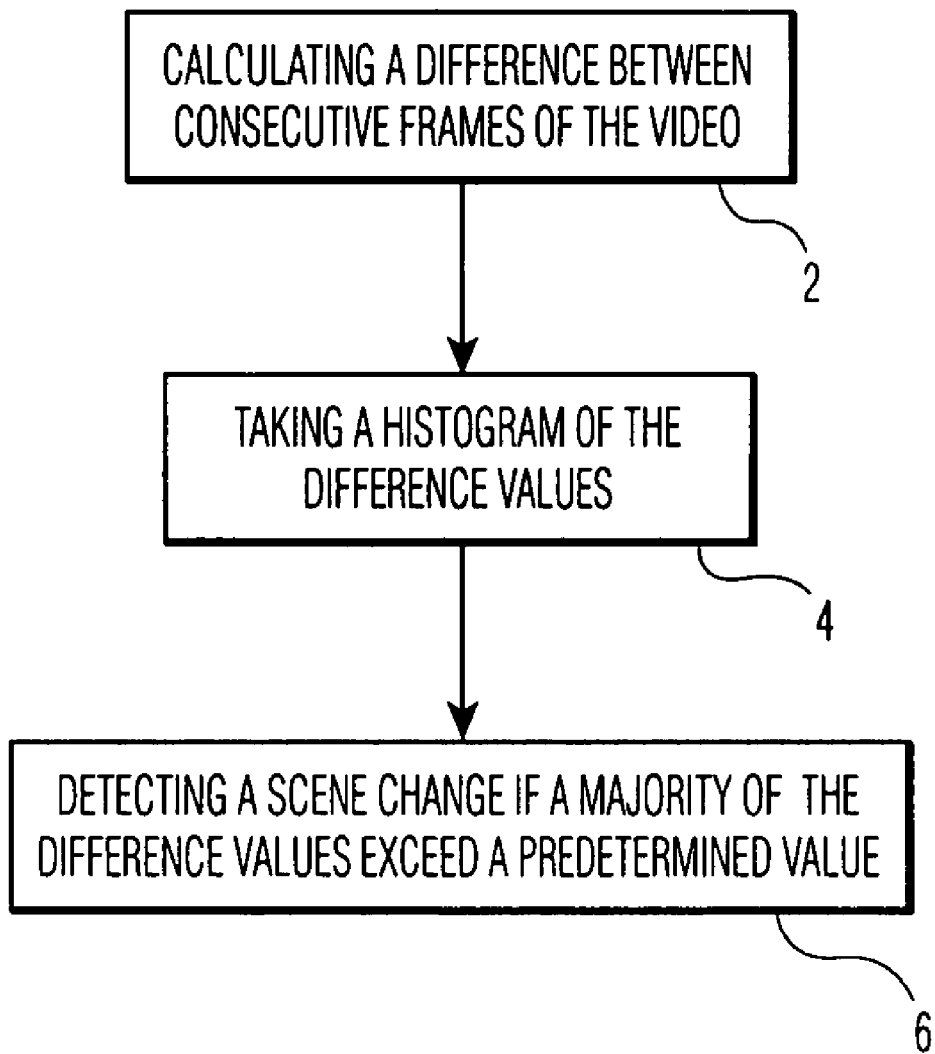
FIG. 1 is a flow diagram of one example of detecting a scene change according to the present invention.

One example of a method for detecting a scene change in video according to the present invention is shown in FIG. 1. For the purpose of this discussion, it is presumed that the frames of video being processed by the method of FIG. 1 have already been decoded. In step 2, a difference between consecutive frames of the video is calculated. This is accomplished by calculating the difference between corresponding pixel values in each of the frames, which is defined as follows:

$$\overrightarrow{D(x)} = |(f(\vec{x}, n) - f(\vec{x}, n-1))| \quad (1)$$

where $$\vec{x} = \begin{pmatrix} x \\ y \end{pmatrix}, \quad f(\vec{x}, n-1)$$

is the pixel value of the frame n at the location $$\vec{x}, f(\vec{x}, n-1)$$

is the pixel value of the previous frame n-1 at the same locations. As a result of step 2, a plurality of difference values are produced that are the magnitudes of the difference between corresponding pixel values in the frames.

According to the present invention, the difference calculated in step 2 may be for all of the pixel values in each of the frames. Alternatively, in order to reduce the number of computations required, the difference may be calculated for a selected portion of the frames. For example, the difference may be calculated for pixel values only in the center of the frames.

In step 4, a histogram of the difference values is taken. A histogram is a well known function for plotting the distribution of a particular variable. In this case, the distribution is defined as His(i):, which is the number of the difference values that equal a particular value i. As previously described, the difference values represent the magnitude of the difference between corresponding pixel values in the frames.

In step 6, a scene change is detected if a majority of the difference values in the histogram exceed a predetermined value. For the purpose of the discussion, a majority is defined as any number over fifty (50) percent. However, depending on the predetermined value selected, the majority of the difference values required to detect a scene change may preferably be greater than fifty (50) percent. For example, for a value of ten (10), it is preferable that sixty-three (63) percent of the difference values in the histogram exceed this value.

In order to perform step 6, it may be preferable to find a characteristic value Q, which satisfies the following condition:

$$\frac{\sum_{i=0}^{Q} His(i)}{\sum_{i=0}^{2^n-1} His(i)} > T1 \quad (2)$$

where His(i) is the histogram value at i and n is the bit precision used by each frame of the video. T1 is a threshold, which in one example may be a value of 0.368. In this example, the characteristic value Q represents a particular difference value in the histogram where 36.8 percent of the difference values have a smaller value. Therefore, Q defines a predetermined range of the different values in the histogram.

Figure 2:
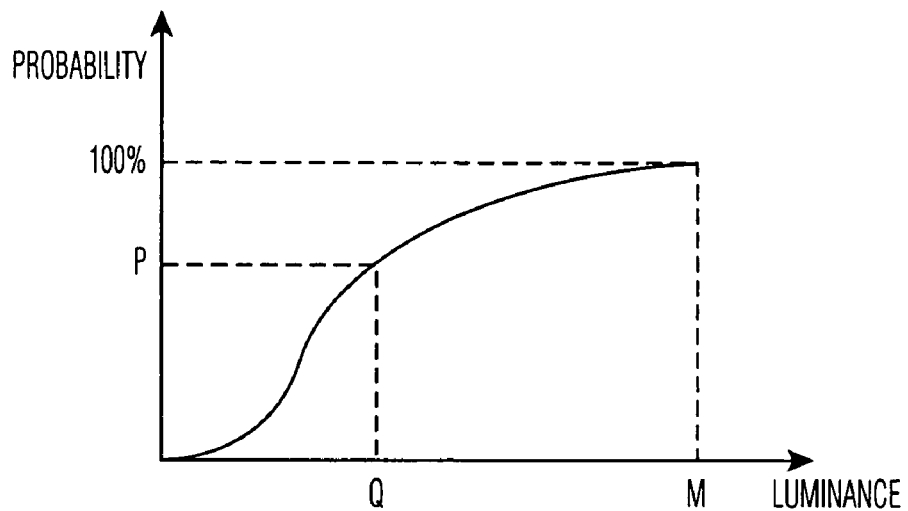
FIG. 2 is a graph illustrating an example of the characteristic value Q.

An example of the characteristic value Q is shown in FIG. 2. As can be seen, Q corresponds to a particular difference value defining a predetermined range. In FIG. 2, the probability is defined as:

$$Prob(j) = \frac{\sum_{i=0}^{j} His(i)}{\sum_{i=0}^{2^n-1} His(i)} \quad (3)$$

As an example in FIG. 2, prob(M)=1 and P=prob(Q) >0.368.

After finding the characteristic value Q, a scene change is detected if the following condition is met: Q>T2. Where T2 is a threshold value. In one example, the threshold value T2 may have a value of ten (10).

Figure 3:
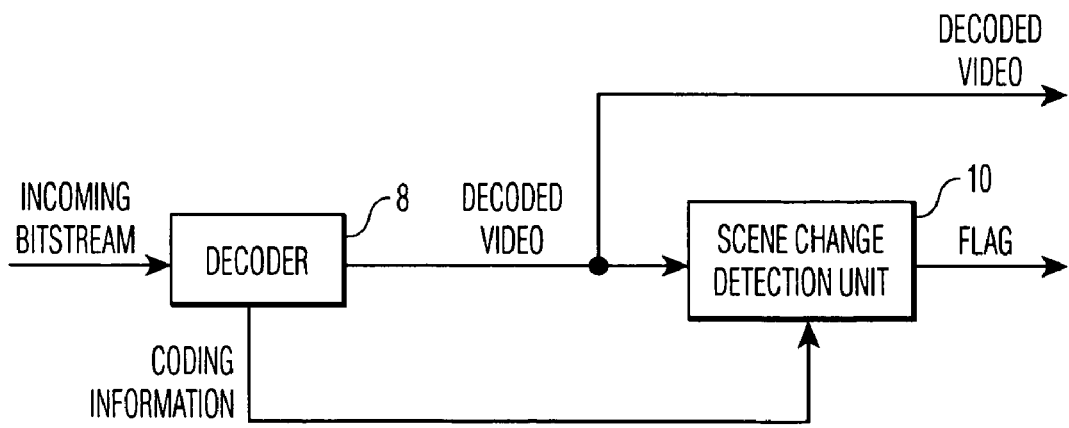
FIG. 3 is a block diagram of one example of a video device according to the present invention.

One example of a video device according to the present invention is shown in FIG. 3. By way of example, the device may represent a television, a set-top box, a desktop, laptop or palmtop computer, a personal digital assistant (PDA), a video/image storage device such as a digital video disc (DVD) player, a digital video recorder (DVR), a TiVO device, etc., as well as portions or combinations of these and other devices.

As can be seen, the device includes a decoder 8 and a scene change detection unit 10. In one embodiment, the device of FIG. 3 may be implemented by a computer readable code that is stored on a memory medium such as a CD-ROM or floppy disk that can be executed by a processor. In other embodiments, hardware circuitry may be used in place of, or in combination with, software instructions to implement the device of FIG. 3.

During operation, the decoder will decode the incoming bit stream in order to produce decoded video frames. According to the present invention, the decoder may be a MPEG-1 decoder, MPEG-2 decoder, MPEG-4 decoder, H.26x decoder or another similar type. The scene change detection unit 10 will then look at the decoded video in order to determine if a scene change has occurred. If a scene change is detected in one of the video frames, the scene detection unit 10 produces a flag identifying which frame has a scene change.

According to the present invention, the scene change detection unit 10 may implement the method of FIG. 1 in order detect a scene change. Thus, the scene change detection unit 10 will perform the method steps of FIG. 1 for all of the decoded video frames. However, utilizing the method of FIG. 1 for all of the frames may not be efficient since it requires always storing the previous frame in order to calculate the difference.

In view of the above, it may be desirable in some situations to implement a strategy to reduce the computational complexity and memory requirement for the scene change detection unit 10. In MPEG bitstreams, there are different types of frames such as an Intra-coded (I) frame, Predicted (P) frame and Bi-directional (B) frame. Depending on the frame type, it would be desirable to use a different technique to detect a scene change. For example, for P and B-frames coding information may be used, while for I frames the method of FIG. 1 may be utilized. Therefore, by using this combined strategy, the computational complexity as well as the memory requirements is significantly reduced since the frequency of I-frames is much lower than P and B-frames in typical MPEG bit-streams.

Figure 4:
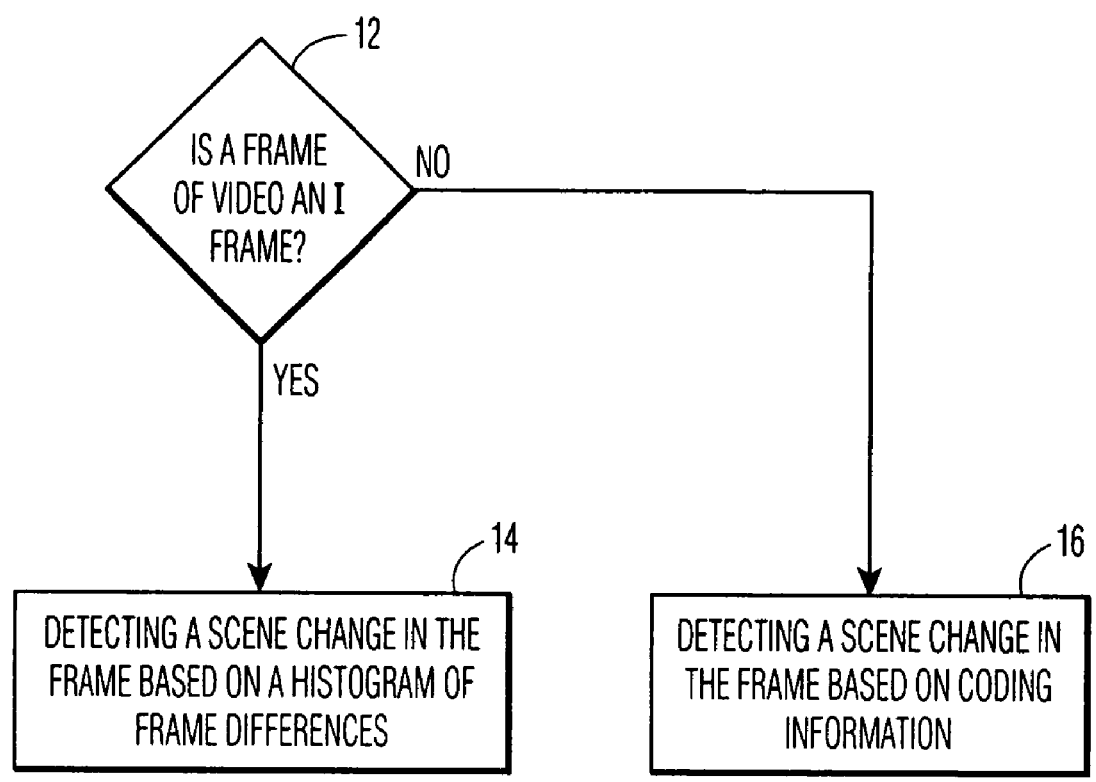
FIG. 4 is a flow diagram of another example of detecting a scene change according to the present invention.

A method of detecting a scene change implementing the above-described strategy is shown in FIG. 4. In step 12, it is determined whether a frame of the decoded video is an I-frame. This may be accomplished by the coding information provided by the decoder 8 in FIG. 3. Such standards as MPEG-1, MPEG-2, MPEG-4, and H.26x all require compliant bit-streams to include header fields identifying the type of frames included. Thus, during operation, as the decoder 8 decodes the incoming bit-stream, it will also look at the header field in order to determine the type of frames in the decoded video. This information will be included in the coding information sent to the scene change detection unit 10 during operation.

In step 12, if it is determined that a frame is an I-frame, then a scene change is detected for that particular frame based on a histogram of frame differences in step 14. Therefore, the scene change detection unit 10 will perform the method of FIG. 1 for that particular frame.

In step 12, if it is determined that a frame is not an I-frame, then a scene change is detected for that particular frame based on coding information in step 16. During operation, the decoder 8 will provide coding information to the scene detection unit 10. As previously described, the coding information includes information about the type of frames in the decoded video. The coding information will also include information about the type of macroblocks that make up a particular frame of video.

For example, if a scene change occurs in a P-frame, the number of Intra-coded macroblocks increases. Therefore, a scene change is detected based on the following criterion:

$$Scene\_Change = \begin{cases} 1 & \text{if } C1 > T3 \\ 0 & \text{else} \end{cases}$$

$$C1 = \frac{Num\_Intra}{Num\_MB}$$

where Num_Intra is the number of the Intra-coded macroblocks, Num_MB is the total number of the macroblocks and T3 is a threshold value. According to this criterion, the scene change detection unit 10 will determine the number of intra-coded macroblocks included in a P-frame. The scene change detection unit 10 will then detect a scene change if the number of Intra-coded macroblocks is greater than a predetermined threshold, which may be twenty (20) percent or higher.

For example, if a scene change occurs in a B-frame, the number of backward-predicted macroblocks increases. Therefore, a scene change is detected based on the following criterion:

$$\text{Scene\_Change} = \begin{cases} 1 & \text{if } C2 > T4 \\ 0 & \text{else} \end{cases}$$

$$C2 = \frac{\text{Num\_Back}}{\text{Num\_MB}}$$

where Num_Back is the number of the backward-predicted macroblocks, Num_MB is the total number of the macroblocks and T4 is a threshold value. According to this criterion, the scene change detection unit 10 will determine the number of backward-predicted macroblocks included in a B-frame. The scene change detection unit 10 will then detect a scene change if the number of backward-predicted macro blocks is greater than a predetermined threshold, which may be seventy (70) percent or higher.

The video device will include other units (not shown) coupled to the outputs of the decoder 8 and scene change detection unit 10. These other units will utilize the flag produced by the scene change detection unit 10 in order to further process the video frames from the decoder 8. For example, a video processing algorithm using a motion-compensated filter may benefit from the scene change detection. During operation, the motion-compensated filtering must be turned off when a scene change occurs otherwise wrong results may result. The video processing algorithm will use the scene change flag produced by the scene change detection unit 10 in order to reset the motion compensated filtering operation.

While the present invention has been described above in terms of specific examples, it is to be understood that the invention is not intended to be confined or limited to the examples disclosed herein. Therefore, the present invention is intended to cover various structures and modifications thereof included within the spirit and scope of the appended claims.

What is claimed is:

1. A method of detecting a scene change in video, the method comprising the steps of:
   calculating a difference between consecutive frames of the video producing a plurality of difference values;
   taking a histogram of the difference values;
   finding a characteristic value (Q) defining a predetermined range of the difference values; and
   detecting a scene change if the characteristic value (Q) exceeds a predetermined value.

2. The method of claim 1, wherein the difference values are the magnitudes of the difference between corresponding pixel values in the consecutive frames.

3. The method of claim 1, wherein the difference between consecutive frames is calculated for a selected portion of the consecutive frames.

4. A method of detecting a scene change in video, the method comprising the steps of:
   calculating a difference between consecutive frames of the video producing a plurality of difference values;
   taking a histogram of the difference values; and
   finding a characteristic value (Q) defining a range of the difference values; and
   detecting a scene change if the characteristic value (Q) exceeds a predetermined value;
   wherein the characteristic value (Q) satisfies the following equation:

$$\frac{\sum_{i=0}^{Q} His(i)}{\sum_{i=0}^{2^n-1} His(i)} > T1$$

where His(i) is the histogram value at i, n is the bit precision used by each frame of the video and T1 is the predetermined value.

5. A computer readable memory medium including code for detecting a scene change in video, the code comprising:
   a code for calculating a difference between consecutive frames of the video producing a plurality of difference values;
   a code for taking a histogram of the difference values;
   a code for finding a characteristic value (Q) defining a predetermined range of the difference values; and
   a code for detecting a scene change if the characteristic value (Q) exceeds a predetermined value.

* * * * *